United States Patent
Baumgartner et al.

(10) Patent No.: US 6,662,623 B2
(45) Date of Patent: Dec. 16, 2003

(54) APPARATUS AND METHOD FOR GLIDE HEIGHT CALIBRATION OF DISK SURFACES BY USE OF DUAL-ZONE LASER TEXTURE

(75) Inventors: Bradley Frederick Baumgartner, Los Banos, CA (US); James Hammond Brannon, Palo Alto, CA (US); Jorge Daniel Colonia, San Jose, CA (US); Huyen D. Do, San Jose, CA (US); Shanlin Duan, Fremont, CA (US); Connie H. Moy, San Jose, CA (US); Hang Fai Ngo, San Jose, CA (US); Yu Lo, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 09/957,291

(22) Filed: Sep. 20, 2001

(65) Prior Publication Data

US 2003/0051529 A1 Mar. 20, 2003

(51) Int. Cl.⁷ .................................................. G11B 5/82
(52) U.S. Cl. ........................................................ 73/1.89
(58) Field of Search ................................ 73/1.04, 1.05, 73/1.79, 1.81, 1.89; 356/600, 615, 620, 243.3; 324/202, 210, 212

(56) References Cited

U.S. PATENT DOCUMENTS

| 5,504,646 A | 4/1996 | Tanaka et al. |
|---|---|---|
| 5,550,696 A | 8/1996 | Nguyen |
| 5,798,884 A | 8/1998 | Gillis et al. |
| 5,956,217 A | 9/1999 | Xuan et al. |
| 6,031,697 A | 2/2000 | Lee et al. |
| 6,088,199 A | 7/2000 | Lee et al. |
| 6,164,118 A | 12/2000 | Suzuki et al. |
| 6,275,029 B1 * | 8/2001 | Schaff .......................... 314/212 |

OTHER PUBLICATIONS

Ting, B.; and Wotipka, J. L.; "*Direct Access Storage Device Recording Head Parking Procedure,*" IBM Technical Disclosure Bulletin, Jun. 1996, vol. 39, No. 06.

Ottesen, H. H.; and Smith, G. J.; "*Scrub Zone for Disk Drive Using Load/Unload,*" IBM Technical Disclosure Bulletin, Jul. 1996, vol. 39, No. 07.

Haswell, J. M.; Holleran; and Workman, M. L.; "*Head Debris Pickup Control in Disk Drive Mechanisms,*" IBM Technical Disclosure Bulletin, Aug. 1997, vol. 40, No. 08.

* cited by examiner

*Primary Examiner*—Robert Raevis
(74) *Attorney, Agent, or Firm*—Lewis L. Nunnelly; Bracewell & Patterson, L.L.P.

(57) ABSTRACT

A disk for calibrating glide heads utilizes a dual-zone configuration of multiple laser melt bumps having selected heights. Averaging the PZT response over many bumps significantly narrows the response distribution, resulting in greater certainty and correlation of the PZT amplitude to bump height. The multiple calibration bumps are circumferentially arranged on a disk surface at a selected radius in a ring-like manner. A second head cleaning zone is provided near the inner diameter of the disk to provide for increased reproducibility of the PZT calibration response. The second zone is densely textured and serves to clean the glide head prior to its use in the calibration zone.

16 Claims, 1 Drawing Sheet

APPARATUS AND METHOD FOR GLIDE HEIGHT CALIBRATION OF DISK SURFACES BY USE OF DUAL-ZONE LASER TEXTURE

BACKGROUND OF THE INVENTION

1. Technical Field

The present invention relates in general to improving disk drive testing devices, and in particular to an improved disk for calibrating glide heads.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

The presence of asperities on the surfaces of the disks can have a deleterious effect on the performance of disk drives. For this reason, a glide test is performed on finished disks to detect asperities that might contact the magnetic head flying at its normal height in a disk drive. In the test, a special glide head containing a piezoelectric transducer (PZT) is flown over a disk at an altitude or height that is below the normal drive fly height. Glide head contact with an asperity creates a PZT voltage response that generally scales with increasing size of the asperity. If the voltage response exceeds a predetermined level, the disk is rejected. As such, quantitative glide testing requires calibration of the voltage response with respect to asperity height.

One method of calibrating glide heads uses a laser-generated, nano-sized protrusion or bump on the surface of a disk that can serve as a calibration asperity. Laser nano-bump generation is a technique that is used throughout the data storage industry. Flying a glide head over a laser nano-bump whose height is known (e.g., by interference or atomic force microscopy) will thus generate a calibrated PZT response. However, when using a single laser calibration bump, statistical variation in the PZT signal from one run to another results in a wide response distribution. Thus, an improved means of calibrating glide heads is needed.

SUMMARY OF THE INVENTION

One embodiment of a disk for calibrating glide heads utilizes a dual-zone configuration of multiple laser melt bumps having selected heights. Averaging the PZT response over many bumps significantly narrows the response distribution, resulting in greater certainty and correlation of the PZT amplitude to bump height. The multiple calibration bumps are circumferentially arranged on a disk surface at a selected radius in a ring-like manner. A second head cleaning zone is provided near the inner diameter of the disk to provide for increased reproducibility of the PZT calibration response. The second zone is densely textured and serves to clean the glide head prior to its use in the calibration zone.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
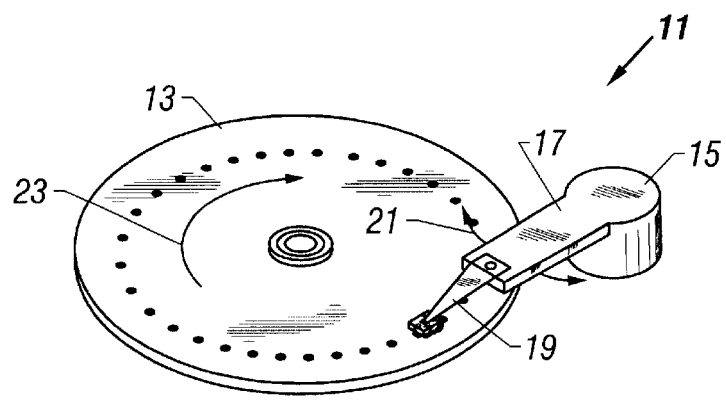
FIG. 1 is a schematic isometric drawing of an apparatus showing a disk and an actuator with a glide head assembly.

Referring to FIG. 1, an apparatus 11 for calibrating a glide head utilizes a rotating, magnetic disk 13 having a large plurality of tracks. Apparatus 11 comprises an actuator 15 with a movable arm 17 and a suspension 19 on one end. Arm 17 and disk 13 move in the directions indicated by arrows 21, 23, respectively. Arm 17 provides the seek motion when changing tracks on disk 13.

Figure 2:
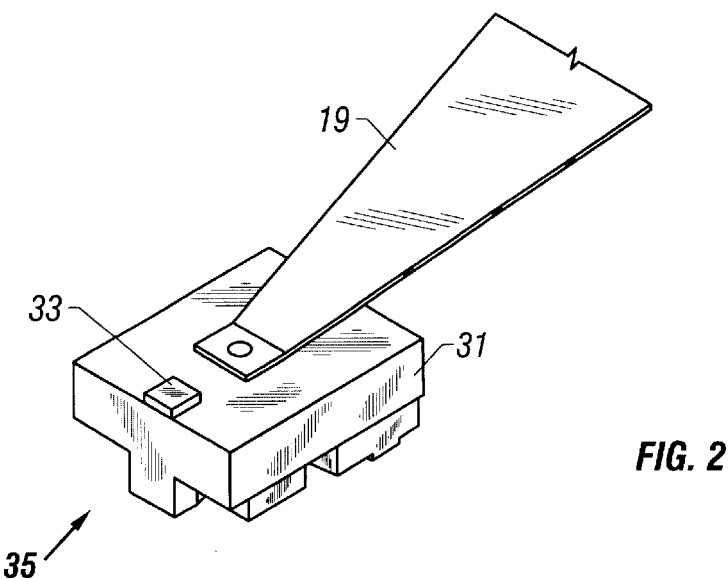
FIG. 2 is an enlarged isometric view of a glide head on the glide head assembly of FIG. 1.

As shown in FIG. 2, a slider or flying/glide head 31 is bonded to the end of suspension 19. In the embodiment shown, glide head 31 is nano size (approximately 2050× 1600×450 microns) and formed from ceramic or intermetallic materials. Glide head 31 may also be pico size (approximately 1250×1000×300 microns). Glide head 31 is pre-loaded against the surface of disk 13 (typically in the range two to ten grams) by suspension 19. It is glide head 31 that is calibrated with respect to the surface of disk 13.

Glide head 31 carries a piezoelectric element 33 (shown schematically) on its upper surface adjacent to suspension 19. The contacting side or air bearing 35 of head 31 which touches disk 13 is located opposite element 33. Element 33 produces an electrical voltage (PZT) signal when head 31 is mechanically excited, such as when air bearing 35 touches a protruding asperity on the surface of disk 13. The stronger the contact between head 31 and the asperity, the higher the signal produced. Thus, with proper calibration, head 31 can be used to determine the size of the disk defects.

Figure 3:
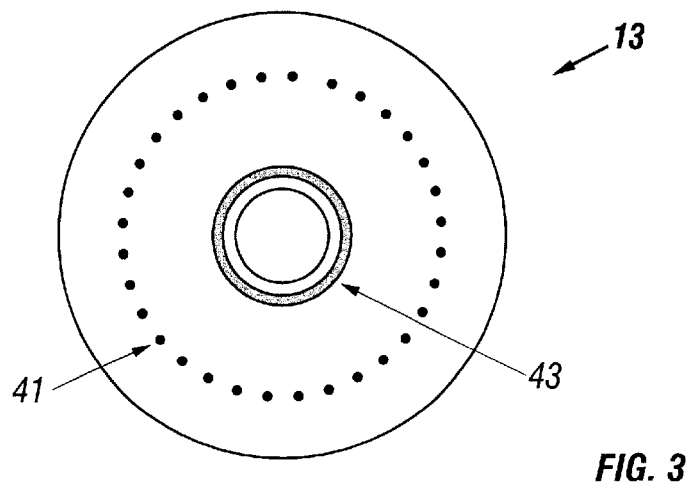
FIG. 3 is a plan view of one embodiment of the disk of FIG. 1 and is constructed in accordance with the present invention.

Referring now to FIG. 3, one embodiment of disk 13 constructed in accordance with the present invention is shown. Disk 13 comprises a platter-like disk substrate having a surface with two unique and separate zones 41, 43 of multiple laser calibration bumps, each of which has selected heights. This configuration contrasts with the prior art use of just one laser calibration bump per disk surface. The multiple bumps of the present invention may be arranged on a disk surface in a variety of configurations.

In the version shown in FIG. 3, the first set of bumps 41 are arranged in a circumferential pattern around the surface of the disk at a given radius between the center and perimeter of the disk. Such a "ring bump" approach works well and provides for ease of fabrication. The radius at which the ring bumps are placed is a calibration zone. The illustrated embodiment of FIG. 3 comprises 32 circumferentially-spaced apart, nano-scale, laser melt bumps (LMB) that are located somewhere near the middle diameter of disk 13. These calibration bumps, all of which protrude from the disk at slightly varying heights (with each individual height known), are spaced apart by a relatively large distance (i.e., isolated from each other by at least one millimeter), and serve to statistically average the PZT response. This provides greater far certainty in the calibration process than is known in the prior art.

For example, in one experiment a glide head was flown over a single calibration bump many times. The standard deviation of the PZT response divided by the mean response was 1.4%. In contrast, when the same ratio was computed for the case of the 32-bump wagon wheel design of the present invention (calibration zone 41), it was found to be 0.6%, which is less than half of the single bump design of the prior art. This result underscores the importance of the multiple bump configuration, which is that the PZT amplitude response not only gets averaged over multiple bumps, but also over a small range of bump heights, due to the fact that each LMB is not exactly the same height.

The second or head cleaning zone 43 of the present invention provides for increased reproducibility of the PZT calibration response. Head cleaning zone 43 is located near the innermost diameter of disk 13. In the preferred embodiment, zone 43 is densely textured with approximately 6000 LMB per square millimeter. Zone 43 serves to clean the glide head prior to its use in calibration zone 41. Experimentation has proven that without cleaning via zone 43, debris tends to build up on the glide head. This results in a changing PZT response and, thus, an undesirable changing calibration over time.

In contrast to the discrete bump configuration of calibration zone 41, cleaning zone 43 is a dense array of LMB located near the inner diameter of disk 13. A typical cleaning zone may comprise a region having an approximately three millimeter radial width or dimension formed by, in the present example, a spiral configuration of LMB. There is one LMB approximately every 25 μm in both the circumferential and radial directions, relative to disk 13. Prior to glide head calibration, the glide head is flown over cleaning zone 43 at a height such that there is a small amount of contact and interference. For example, for cleaning bumps having a height of approximately 20 μm, the glide head may be flown at about 18 nm from the surface of the disk. This would provide about 2 nm of interference between the LMB of cleaning zone 43 and the glide head. Such "gentle" contact serves to dislodge and clean any debris attached to the glide head. Eliminating debris build-up on the glide head serves to keep and maintain the calibrated PZT response.

One relatively recent prior art reference, U.S. Pat. No. 5,956,217 (Xuan), describes a method for creating a reference disk for glide calibration by using LMB to create an extremely closely-spaced apart set of calibration bumps. The bumps of Xuan essentially form a continuous circle around the surface of the disk. The distinguishing features of this prior art work are that the calibration bumps are very narrow (bump diameters of 3 to 9 μm), and they are located very close together (as close as 30 μm). Thus, with a set of LMB located at a disk diameter of 65 mm, Xuan describes a calibration region possessing a linear bump density of 33 bumps per millimeter. Because of this high density, the PZT response of a glide head would be due to the collective effects of many bumps, rather than the effect of a single isolated bump.

In contrast, Applicant's present invention removes this ambiguity and imprecision by permitting correlation of the PZT response to the average of many single and isolated LMB. It is impossible to get good, individual defect simulation (which is the entire purpose of glide calibration) by densely populating a disk with LMB that produce a constant and continuous output signal from a glide head. Moreover, Xuan does not call for or discuss a separate cleaning zone.

The present invention has several advantages. The prior art use of a single bump per disk surface yields statistical variation in the PZT response from one run to another, which results in an undesirably wide response distribution. Applicant's invention averages the PZT response over many bumps to significantly narrow the response distribution, resulting in greater certainty and correlation of the PZT amplitude to bump height. The multiple calibration bumps are circumferentially arranged on a disk surface at a selected radius in a ring-like manner. The second head cleaning zone provided near the inner diameter of the disk provides increased reproducibility of the PZT calibration response. The second zone is densely textured and serves to clean the glide head prior to its use in the calibration zone.

While the invention has been shown or described in only some of its forms, it should be apparent to those skilled in the art that it is not so limited, but is susceptible to various changes without departing from the scope of the invention.

What is claimed is:

1. A disk for calibrating a glide head, comprising:
   a disk substrate having a center, a perimeter, and a surface;
   a calibration zone of laser melt bumps located between the center and the perimeter of the disk, wherein the laser melt bumps are fanned in a selected pattern; and wherein
      the laser melt bumps are isolated from each other by at least one millimeter such that individual ones of the laser melt bumps may be sensed by the glide head for improved glide head calibration.

2. The disk of claim 1 wherein calibration zone is located adjacent to a radially central portion of the disk in a circumferential pattern at a selected radius from the center of the disk.

3. The disk of claim 1 wherein the laser melt bumps protrude from the surface at heights that differ from each other with the height of each individual laser melt bump being known.

4. The disk of claim 1, further comprising a head cleaning zone radially spaced apart from the calibration zone for increased reproducibility of a calibration response by cleaning the glide head prior to its use in the calibration zone.

5. The disk of claim 4 wherein the cleaning zone is located near the center of the disk.

6. The disk of claim 4 wherein the cleaning zone is a dense array of approximately 6000 laser melt bumps per square millimeter on the surface of the substrate.

7. The disk of claim 4 wherein the laser melt bumps are located in the cleaning zone and are contained in an approximately three millimeter radial dimension with one laser melt bump approximately every 25 $\mu$m in both circumferential and radial directions, relative to the disk substrate.

8. A disk for calibrating a glide head, comprising:
   a disk substrate having a center, a perimeter, and a surface;
   a calibration zone of laser melt bumps located between the center and the perimeter of the disk, wherein the laser melt bumps are located between the center and the perimeter in a circumferential pattern at a selected radius from the center of the disk; and
   a head cleaning zone spaced apart from the calibration zone.

9. The disk of claim 8 wherein the laser melt bumps are isolated from each other by at least 1 mm such that individual ones of the laser melt bumps may be sensed by the glide head for improved glide head calibration.

10. The disk of claim 8 wherein the laser melt bumps protrude from the surface at different heights with each individual height known.

11. The disk of claim 8 wherein the cleaning zone is located near the center of the disk.

12. The disk of claim 8 wherein the cleaning zone is a dense array of approximately 6000 laser melt bumps per square millimeter on the surface of the substrate for increased reproducibility of a calibration response by cleaning the glide head prior to its use in the calibration zone.

13. The disk of claim 8 wherein the laser melt bumps are located in the cleaning zone and are contained in an approximately three millimeter radial dimension with one laser melt bump approximately every 25 $\mu$m in both circumferential and radial directions, relative to the disk substrate.

14. A method of calibrating a glide head, comprising:
   (a) providing a disk with a center, a perimeter, a surface, a calibration zone on the surface, and a separate head cleaning zone on the surface;
   (b) flying a glide head over the cleaning zone to clean the glide head; and then
   (c) flying a glide head over the calibration zone to calibrate the glide head.

15. The method of claim 14 wherein step (b) comprises flying the glide head over the cleaning zone at a height such that there is a small amount of contact and interference therebetween to dislodge and clean any debris attached to the glide head.

16. The method of claim 14 wherein step (a) comprises providing the calibration zone with laser melt bumps that are widely spaced apart from each other by at least one millimeter, and providing the cleaning zone with a dense array of approximately 6000 laser melt bumps per square millimeter for increased reproducibility of a calibration response by cleaning the glide head prior to its use in the calibration zone.

* * * * *

UNITED STATES PATENT AND TRADEMARK OFFICE
CERTIFICATE OF CORRECTION

PATENT NO.   : 6,662,623 B2
DATED        : December 16, 2003
INVENTOR(S)  : Baumgartner et al.

It is certified that error appears in the above-identified patent and that said Letters Patent is hereby corrected as shown below:

Column 5,
Line 7, please remove the word "fanned" and insert the word -- formed -- between the words "are" and "in".

Signed and Sealed this

Thirtieth Day of March, 2004

JON W. DUDAS
*Acting Director of the United States Patent and Trademark Office*